Feb. 11, 1969      S. MAZZELLA      3,426,824
TIRE ADAPTER ASSEMBLY
Filed March 30, 1967      Sheet 1 of 2
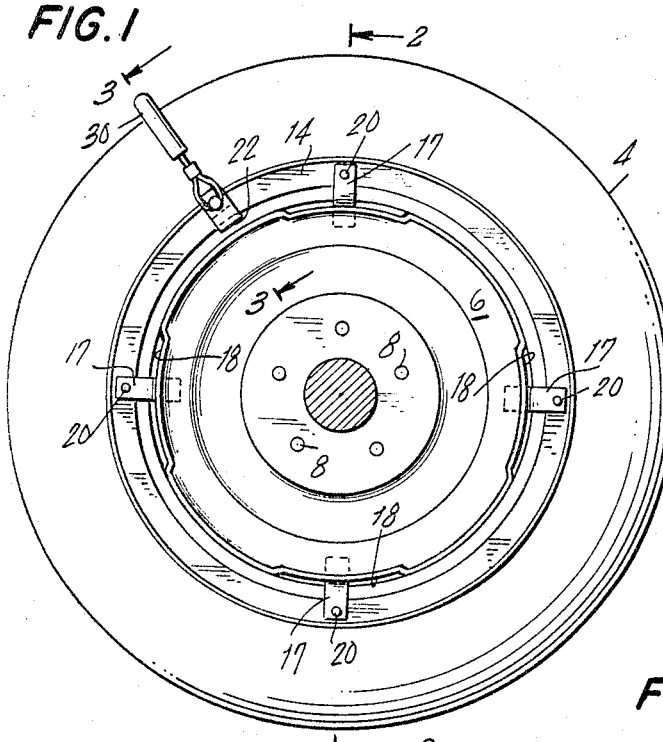
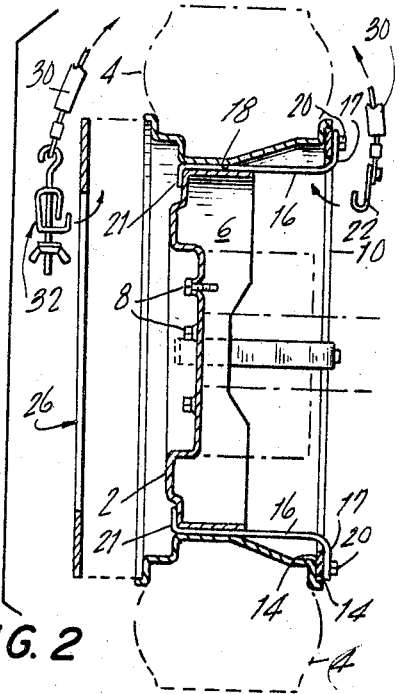
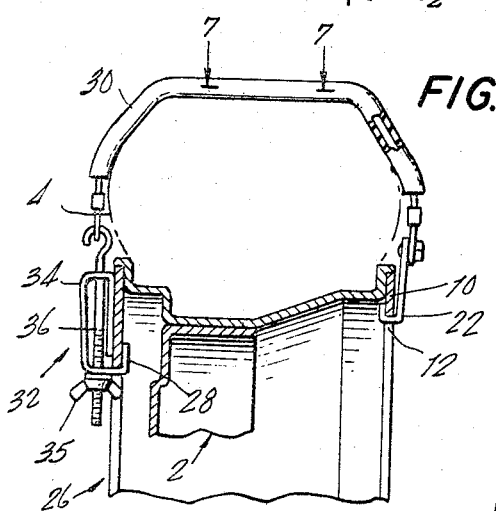
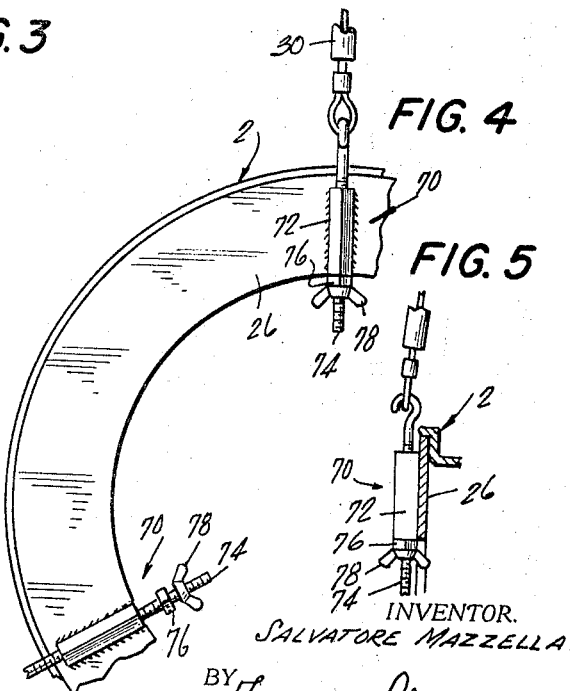
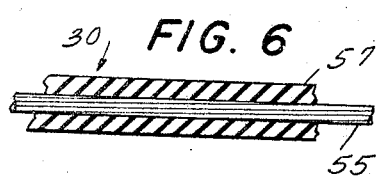
INVENTOR.
SALVATORE MAZZELLA
BY Friedman & Goodman
ATTORNEYS

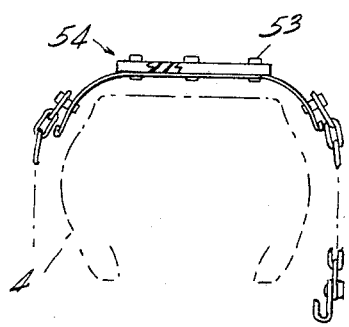
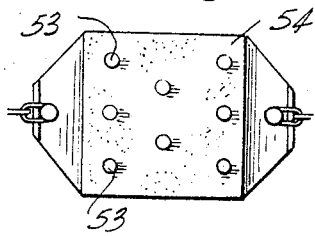
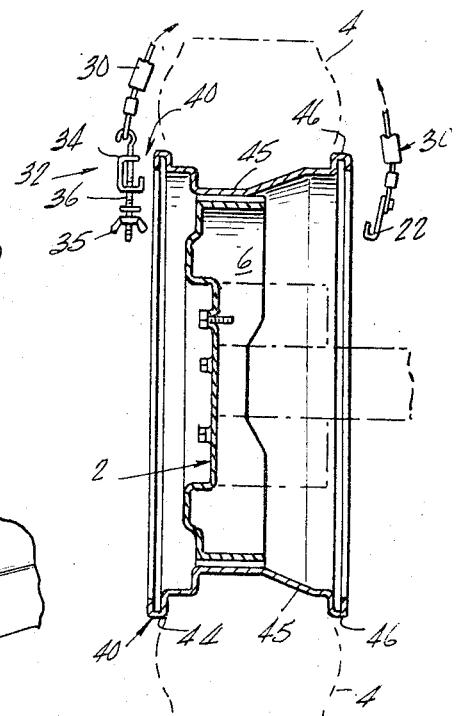
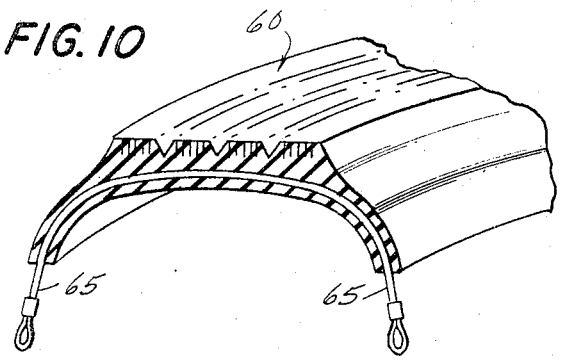
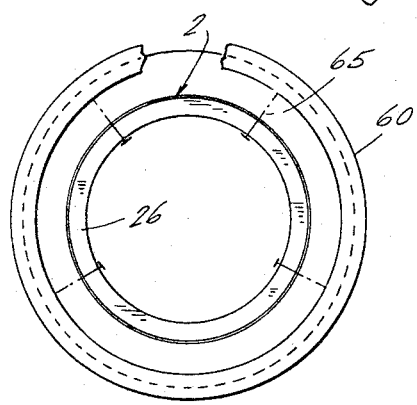

United States Patent Office 3,426,824
Patented Feb. 11, 1969

3,426,824
TIRE ADAPTER ASSEMBLY
Salvatore Mazzella, 517 Clinton St.,
Brooklyn, N.Y. 11231
Filed Mar. 30, 1967, Ser. No. 627,084
U.S. Cl. 152—242                5 Claims
Int. Cl. B60c 27/20, 27/02

ABSTRACT OF THE DISCLOSURE

This invention and this disclosure are directed to a tire chain adapter assembly. More particularly, this invention and this disclosure are directed to an improved tire chain adapter assembly which permits tire chains facilitating snow driving to be placed about the car without the necessity of jacking up the car. In a particularly desirable embodiment this invention contemplates such a tire chain assembly in combination with the tire chain, the tire chain having suitably arranged lugs, spikes or cleats for gripping the snow. The adapter assembly comprises means affixed to either side of a tire wheel and hook means affixed to said means adaptable to engage the hooked end of a tire chain.

BACKGROUND OF THE INVENTION

Field of the invention

This invention lies in the field of snow chains and, more particularly, in the field of means in combination with the wheel of a car to provide a suitable hook-up for tire chains. More specifically, this invention relates to an adapter assembly which converts a wheel base of an automobile or truck wheel into a form which permits chains to be fitted around the wheel in a transverse direction, i.e. in a direction running perpendicular to the direction of travel of the wheel.

Discussion of the prior art

Generally speaking, the use of tire chains is to facilitate automobile or truck movement on a snow or ice surface. Tire chains heretofore employed have necessitated jacking up of the automobile or at least several different movements of the car. The chains, of necessity, ran in the same direction as the direction of revolution of the tire. This means that the entire surface of the tire was covered with the chain. This means that oftentimes the amount of chains on the tire was disproportionately high relative to the amount of snow and ice on the road. This caused wearing of not only exposed roadway unnecessarily but wearing of the expensive tire as well. The reason for this type of tire lies primarily in the fact that means have not heretofore been provided which satisfactorily enabled the ready placing of the tire chains across the tire in a direction perpendicular to the direction of travel in a manner in which the desired amount of chain along the tire periphery could be regulated.

SUMMARY OF THE INVENTION OBJECTS

It is an object of this invention, therefore, to provide a tire chain adapter assembly which facilitates placing tire chains on automobile or truck tires and the like.

It is another object of this invention, therefore, to provide such a tire chain adapter assembly which enables placing the chains over the tire surface in a direction perpendicular to the direction of travel of the tire.

It is still another object of this invention, therefore, to provide such a tire chain adapter assembly which permits the regulation and variation of the amount of tire chain passing across the periphery of the tire.

It is still another object of this invention, therefore, to provide such a tire chain adapter assembly which can be used with modified and improved snow embedding traction elements.

These and other objects of this invention will become apparent from the following complete description, accompanying drawings and appended claims.

STATEMENT OF THE INVENTION

Broadly, this invention contemplates a tire chain adapter assembly comprising a pair of disc-shaped plates adapted to overlie a wheel, said disc-shaped plates provided with intermittently spaced slots (inward of the periphery of said plates whereby the ends of a tire chain provided with hook members can pass through said slots and engage said discs in hooking relationship, one of said discs adaptable to be rigidly mounted against said wheel whereby a tire chain can be hooked on both sides of said wheel and pass across the circular periphery of a tire on said wheel.

In a particularly desirable embodiment, this invention contemplates such a tire chain adapter assembly wherein one of said plates is affixed to said wheel by an S-shaped adapter clamp passing through an open portion in said wheel engaging one side with a lip of said S-shaped adapter clamp and engaging the opposite side by being bolted to the rim portion through the other lip of said S-shaped adapter clamp.

In another feature of my invention I provide a wheel rim having on both sides a hooked shaped circumference bordering the tire mounting.

DESCRIPTION OF THE DRAWINGS

The invention can be more readily understood by reference to the accompanying drawings, in which:

FIGURE 1 is a side view of an automobile wheel and the tire provided with the tire chain adapter assembly of this invention. The side of the tire visible in the side facing the drive shaft of the automobile;

FIGURE 2 is a sectional view of the wheel tire and adapter assembly shown in FIGURE 1, the section being taken along lines 2—2 of FIGURE 1 and the view being partially exploded;

FIGURE 3 is a sectional view of the wheel, tire and adapter assembly shown in FIGURE 1, said sectional view taken along the lines 3—3 of FIGURE 1;

FIGURE 4 shows a modified form of the invention;

FIGURE 5 is a side elevation of the turnbuckle shown in FIGURE 4 which is rigidly affixed to the tire chain adapter;

FIGURE 6 is a magnified view of a portion of FIGURE 3;

FIGURE 7 is a side elevation partially broken away showing a snow embedding traction element which can be applied to the periphery of the tire using the instant invention;

FIGURE 8 is a plan view of the snow emebdding traction element shown in FIGURE 7;

FIGURE 9 is a view similar to FIGURE 2 showing a novel arrangement of hook shaped peripheries on a wheel enabling fastening chains across the tire periphery;

FIGURE 10 is a snow tread which can be applied to a tire using the tire chain adapter assembly of this invention; and FIGURE 11 is a side elevation of a tire carrying the snow tread shown in FIGURE 10 which figure is partially broken away.

DESCRIPTION OF A PREFERRED EMBODIMENT

A preferred embodiment of this invention is shown in the accompanying drawings, in which a wheel 2 is provided with a tire 4 and held firmly to a revolvable axle end 6 by lugs 8. A circular disc plate member 10 having slots or apertures 12 is held firmly against rim 14 employing S-shaped adapter clamp 16 passing through an aperture 18 in wheel 2. One lip 17 of S-shaped adapter clamp 16 is bolted against rim 14 using bolt 20. The other lip 21 of the S-shaped clamp overlies tightly a portion of wheel 2. The slots or apertures on the surface of plate member 10 are inwardly directed thus permitting hooking engagement with plate 10 by hook end 22 at one end of the tire chain element. The slots 12 run in an intermittent fashion in a circle on the surface of plate member 10.

On the other side of wheel 2 there is a second circular disc plate member 26 shown in FIGURE 2 exploded away from the wheel. This is also provided with intermittently spaced slots inwardly of the periphery of the plate adaptable to be engaged with a hook 28 (FIG. 3) passing through the slot and engaging the portion of plate member 26 between the slot and the outer periphery. The size and/or length of the slots in plate members 10 and 26 can vary widely depending on the material of construction and the use intended. The hook 28 is provided at the other end of tire chain 30 and mounted on the side of hook 28 is adjusting means 32 consisting of metal clamp member 34, shaft 36 and overlying nuts 35 permitting adjustment. The use of the adjusting means 32 enables clamping and clasping the tire chains or snow engaging means tightly against the tire periphery as shown in FIGURE 3. Thus, the use of the pair of plates adapted to overlie the wheel enables the hooking up of tire chains across the tire. Since the number of slots in the plates can be regulated one can readily vary the number of chains placed across the tire to coincide with the amount of chain necessary for the particular weather conditions. If desired, as many chains as there are slots for engagement of the plate edges with the hooks at the chain ends, can be employed. Alternatively, one may decide under milder weather to employ fewer chains and to space them evenly about the periphery of the tire. Should the weather conditions become more severe with probability of more snow, additional chains can be readily added without necessitating jacking up the automobile or truck. The adapter assembly is already in place.

In another embodiment of my invention, I provide a wheel which on either side of the tire mounting has a hook shaped circular periphery bordering the tire. This enables dispensing with the aforementioned and described embodiment. Specifically, I contemplate employing hook shaped periphery 40 and 42 formed into hooks 44 and 46 about the entire periphery of the wheel bordering the tire, i.e. at the edge of the tire mounting 45. This enables in a similar fashion engagement on one side of tire 4 the hook 22 with hook 46 and on the other side hook 28 provided with turnbuckle mechanism 32 with hook 44 as seen in FIGURE 9.

In association with the tire chain adapter assemblies described above I contemplate employing a normal chain for engagement with the snow or ice on the road. Alternatively, I contemplate either alone or in association with a standard chain use of an arcuate plate 54 provided with cleat or spike elements protruding outward as shown in FIGURES 7 and 8. The cleats 53 are preferably arranged as shown in alternating rows with every other transverse row having cleats in a different longitudinal path than its next adjacent transverse row. The cleats can be made of my suitable durable material, e.g. titanium or tungsten carbide metal. The arcuate plate 54 can be any suitable length provided it does not substantially hinder the normal wheel and tire revolution.

While I contemplate using a normal tire chain I prefer from both a safety standpoint and from the standpoint of a smooth ride the resilient snow engaging means shown in FIGURES 3 and 4. The resilient snow engaging means 30 comprises a strong interior cable 55 covered with and preferably snugly fitting a resilient durable plastic or rubber sleeve 57. This enables a smooth ride yet it allows for substantial engagement of the snow engaging means with the snow providing the needed traction. In addition, it is far less harmful to road surfaces than coarse chains normally employed.

In another facet of my invention I contemplate employment of a snow tire tread which can be snugly fit around a normal tire using the assembly described above. This snow tire tread is illustrated in FIGURES 10 and 11. It comprises a tread 60 made of rubber suitably reinforced with rayon, nylon or polyester tire cord. Passing transversely through the tread is cord 65 having means attached to both ends for engagement with the tire rim. This circular snow tire tread is applied to the tire simply by partially deflating the tire on the car fitting the snow tread over it and engaging it tightly to the tire chain adapter of this invention at rims 44 and 46, for instance. The regular tire is then inflated until it fits snugly into the arcuate curvature of the inside of the snow tire tread. This concept need not be restricted to the use of a snow tire tread although its prime advantage resides therein. One can employ this tread whether or not the particular tread is a snow tread. In such case the tread would be applied when the tread of the basic tire had worn down to the point where caution required use of more tread surface to grip the road.

Another embodiment of my invention is particularly illustrated in FIGURES 4 and 5 which show disk 26 as in FIGURES 1, 2 and 3, but instead of employing the removable adjustable hook element 32, there is welded to rim 14 an adjustable toggle bolt 70 comprising a fixed sleeve 72 interiorly threaded to receive reciprocally threaded end piece 74, nut 76 and wing nut 78. Using these latter elements the snow embedding means can be securely fixed over the circumference of the tire.

It should be apparent that the foregoing is a broad disclosure of my invention and that I have provided new and unique snow embedding adapter means to be used either with conventional link chain or, optionally, with a rubber or plastic covered cable for smoother ride and less damage to the roads. It will also be apparent that the use of the cleat plate or the snow tread provides unexpected advantages not heretofore contemplated.

I claim:

1. A tire chain adapter assembly comprising a pair of disc-shaped plates adapted to overlie opposite sides of a wheel, said disc-shaped plates provided with intermittently spaced slots inwardly of the periphery thereof, one of said discs having S-shaped adapter clamp means thereon adapted to pass through open portions in a wheel to engage one side of the wheel with a lip of said S-shaped clamp and bolt means passing through said disc and the other lip of said S-shaped adapter clamp, and adapted to attach the disc to the wheel rim, and snow embedding means adapted to overlie the tire on the wheel and having securing means adapted to be received by said slots.

2. A tire adapter assembly according to claim 1, wherein said snow embedding means is a chain.

3. A tire adapter assembly according to claim 1, wherein said snow embedding means is a cable having a sleeve thereover of a resilient matter of the group of rubber and plastic.

4. A tire adapter assembly according to claim 1, wherein said snow embedding means is an arcuate plate provided with upwardly extending cleats arranged in alternating rows with every other transverse row having cleats in a different longitudinal path than its next adjacent transverse row.

5. A tire adapter assembly according to claim 1, wherein said snow embedding means is a circular rubber tread provided with an interior arc adapted to be engaged over a tire, said tread provided with fastening means for fastening the rubber tread to the wheel rim.

References Cited

UNITED STATES PATENTS

| | | | |
|---|---|---|---|
| 1,336,363 | 4/1920 | McLaughlin | 152—242 |
| 1,523,499 | 1/1925 | Sullivan | 152—233 |
| 1,822,343 | 9/1931 | Gillet | 152—237 |
| 2,625,977 | 1/1953 | Caruolo | 152—242 |
| 2,328,808 | 9/1943 | Holtz | 152—242 |
| 2,505,711 | 4/1950 | Hughes | 152—233 |
| 2,579,057 | 12/1951 | Traver | 152—233 |
| 2,625,977 | 1/1953 | Caruolo | 152—242 |
| 2,929,428 | 3/1960 | Holzmueller | 152—236 |
| 2,998,835 | 9/1961 | Di Fonzo | 152—236 |
| 3,362,450 | 1/1968 | Brown | 152—233 |

ARTHUR L. LA POINT, *Primary Examiner.*

S. T. KRAWCZEWICZ, *Assistant Examiner.*

U.S. Cl. X.R.

152—221, 225, 187